United States Patent [19]

Katagiri et al.

[11] Patent Number: 5,499,865
[45] Date of Patent: Mar. 19, 1996

[54] BRAKE FORCE CONTROL DEVICE FOR A VEHICLE

[75] Inventors: Masayoshi Katagiri, Toyota; Kazuhiko Suzuki; Mitsunari Takeuchi, both of Kariya, all of Japan

[73] Assignee: Aisin Seiki Kabushiki Kaisha, Kariya, Japan

[21] Appl. No.: 346,913

[22] Filed: Nov. 23, 1994

[30] Foreign Application Priority Data

Nov. 29, 1993 [JP] Japan ..................................... 5-298692

[51] Int. Cl.⁶ ................................................. B60T 8/42
[52] U.S. Cl. ..................... 303/115.2; 303/116.2; 303/901; 137/901; 137/614.14; 251/129.14
[58] Field of Search .......................... 303/115.2, 115.4, 303/116.2, 145, 162, 10, 11, 3, 15, 901; 188/162, 181 R; 137/901, 614.14; 251/129.14

[56] References Cited

U.S. PATENT DOCUMENTS

| | | | |
|---|---|---|---|
| 5,042,885 | 8/1991 | Villec | 303/115.2 X |
| 5,147,116 | 9/1992 | Parker et al. | 303/901 X |
| 5,207,488 | 5/1993 | Newton et al. | 303/115.2 |
| 5,211,455 | 5/1993 | Matouka et al. | 303/115.2 |
| 5,219,213 | 6/1993 | Matouka et al. | 303/115.2 |
| 5,219,214 | 6/1993 | Savage et al. | 303/115.2 |

FOREIGN PATENT DOCUMENTS 3-5270  1/1991  Japan.

Primary Examiner—Robert J. Oberleitner
Assistant Examiner—Lee W. Young
Attorney, Agent, or Firm—Burns, Doane, Swecker & Mathis

[57] ABSTRACT

A brake force control device for a vehicle includes a master cylinder for being operated by an operating member of the vehicle, a wheel brake for being mounted on a vehicle wheel which is connected to the master cylinder through a conduit, a pressure control chamber connected to the wheel brake, a displacement actuator which varies a capacity of the pressure control chamber and a control unit which controls the displacement actuator. The displacement actuator includes a plunger which varies a capacity of the pressure control chamber, a drive unit which drives the plunger, a first valve which closes the conduit when the plunger is operated to decrease the capacity of the pressure control chamber and which opens the conduit when the first valve receives a brake pressure from the master cylinder which is larger than that in the pressure control chamber with a predetermined value, and a second valve which closes the conduit when the plunger is operated to increase the capacity of the pressure control chamber and which opens the conduit when the brake pressure in the pressure control chamber is larger than that in the master cylinder with a predetermined value.

11 Claims, 4 Drawing Sheets

BRAKE FORCE CONTROL DEVICE FOR A VEHICLE

BACKGROUND OF THE INVENTION

1. Field of the Invention

This invention relates to brake systems for a vehicle and more particularly to a brake force control device for a vehicle.

2. Description of the Related Art

A conventional brake force control device for a vehicle is disclosed in Japanese Patent Laid Open Publication No. 3(1991)-5270. A prior art brake pressure circuit of the prior art is shown in FIG. 4.

The brake force control device for a vehicle comprises a master cylinder 100 operated by a brake pedal 101 so as to generate a brake pressure, a wheel brake 102 including a brake cylinder which imparts a braking force to a wheel by the brake pressure, and a brake force control actuator 103 which includes a pressure control chamber connected to the brake cylinder, and a displacement actuator which varies the capacity of the pressure control chamber.

The master cylinder 100 is connected to the wheel brake 102 by a conduit 104 having a first normally open solenoid valve 105 and a second normally open solenoid valve 106. A first one way valve 107 which prevents brake fluid from flowing to the wheel brake 102 from the master cylinder 100 is disposed in parallel arrangement with the first normally open solenoid valve 105. Further, a second one way valve 108 which prevents the brake fluid from flowing to the master cylinder 100 from the wheel brake 102 is disposed in parallel arrangement with the second normally open-solenoid valve 106.

The displacement actuator installed in the brake force control actuator 103 is driven by an electric motor 103a to vary the capacity of the pressure control chamber. The first solenoid valve 105 is closed to separate the wheel brake 102 and the pressure control chamber from the master cylinder 100 when the wheel brake 102 is under an antilock condition. On the other hand, the second solenoid valve 106 is closed when the wheel brake 102 is under an antislip condition. At these times, the displacement actuator increases and decreases the capacity of the pressure control chamber. Therefore, since the pressure control chamber is connected to the wheel brake 102, the brake force control actuator 103 increases and decreases the brake pressure in the wheel brake 102.

Under the antislip condition, the brake fluid quickly flows into the wheel brake 102 from the master cylinder 100 through the second one way valve 108 when the vehicle needs to be stopped. Further, under the antilock condition, the brake fluid rapidly flows into the master cylinder 100 from the wheel brake 102 through the first one way valve 107 when the brake pedal is released.

In accordance with this known system, the wheel brake 102 is connected to the master cylinder 100 through two solenoid valves 105, 106 and two one-way valves 107, 108. Therefore, the brake force control device must comprise eight solenoid valves and eight one-way valves when the brake pressure of each of the four wheel brakes is controlled independently. Consequently, the conventional brake force control device for a vehicle comprises a large number of components and the brake force control device is expensive.

SUMMARY OF THE PRESENT INVENTION

It is an object of the present invention to provide a brake force control device for a vehicle which is simple in structure and low in cost.

It is another object of the present invention to provide a brake force control device for a vehicle which is small in size and light in weight.

It is a further object of the present invention to provide a brake force control device for a vehicle which can be easily manufactured.

It is a further object of the present invention to provide a brake force control device for a vehicle which is durable.

To achieve the above mentioned objects, a brake force control device for a vehicle in accordance with this invention comprises a master cylinder for being operated by an operating member of the vehicle, a wheel brake for being mounted on a vehicle wheel which is connected to the master cylinder through a conduit, a pressure control chamber connected to the wheel brake, a displacement actuator which varies the capacity of the pressure control chamber, and a control unit which controls the displacement actuator. The displacement actuator includes a plunger which varies the capacity of the pressure control chamber, a drive unit which drives the plunger, a first valve which closes the conduit when the plunger is operated to decrease the capacity of the pressure control chamber and opens the conduit when the first valve receives a brake pressure from the master cylinder which is larger than that in the pressure control chamber with a predetermined value, and a second valve which closes the conduit when the plunger is operated to increase the capacity of the pressure control chamber and opens the conduit when the brake pressure in the pressure control chamber is larger than that in the master cylinder with a predetermined value.

BRIEF DESCRIPTION OF THE DRAWING FIGURES

The features and advantages of the brake force control device for a vehicle according to the present invention will be more clearly appreciated from the following description considered in conjunction with the accompanying drawing figures, wherein.

DETAILED DESCRIPTION OF A PREFERRED EMBODIMENT OF THE INVENTION

Figure 1:
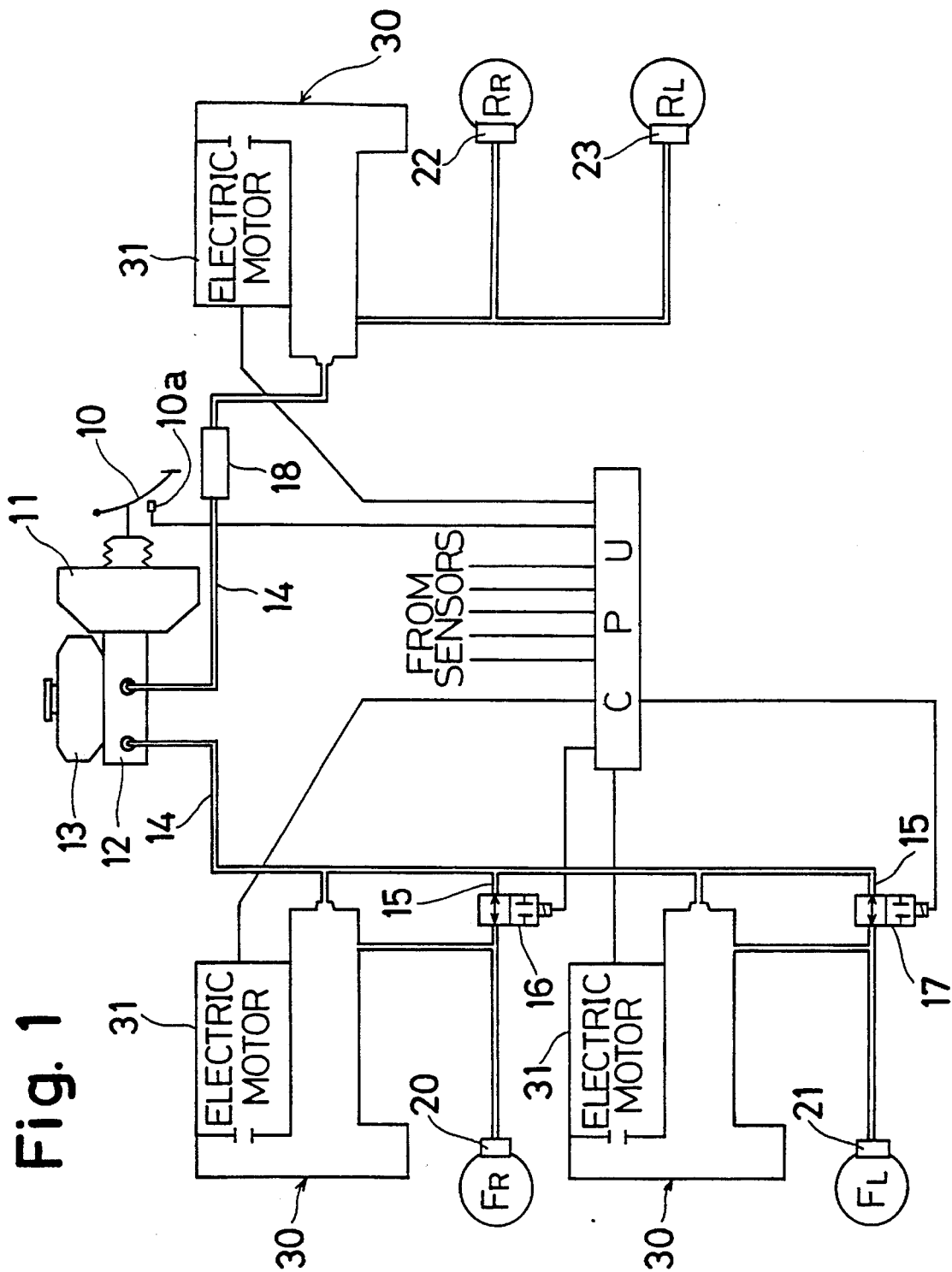
FIG. 1 is a circuit diagram of a brake force control device for a vehicle of the present invention.

With reference to FIG. 1, a brake booster 11 is mounted on a vehicle body (not specifically shown in the drawing figures) so as to be operated by a brake pedal 10. A master cylinder 12 connected to a reservoir tank 13 is fixed to the brake booster 11. A brake force generated by the brake pedal 10 is boosted by the brake booster 11 and transmitted to the master cylinder 12 in order to generate a brake pressure. A brake switch 10a is connected to the brake pedal 10.

Wheel brakes 20, 21, 22 and 23 which each brake respective wheels FR, FL, RR and RL are connected to the master cylinder 12 through a pair of conduits 14. Displacement actuators 30 which are each driven by an electric motor 31 to vary the capacity of a pressure control chamber 36 (shown in FIG. 2) are hydraulically connected to the conduits 14. In accordance with the disclosed embodiment, the brake force control device for a vehicle comprises three displacement actuators 30 so that the brake force imparted to each of the front wheels FR, FL can be controlled independently and so that the brake forces imparted to the rear wheels RR, RL can be controlled concurrently.

A pair of bypass conduits 15 are connected to the front wheel side conduits 14 respectively so as to be in a parallel arrangement with each of the displacement actuators 30. Normally open solenoid valves 16, 17 are disposed in the bypass conduits 15 respectively. The solenoid valves 16, 17 are controlled by an electric controller CPU. The electric controller CPU controls the operations of the electric motors 31 so as to control the brake forces of the wheels FR, FL, RR and RL based on conditions of the wheels FR, FL, RR and RL detected by wheel sensors (not specifically shown in the drawing figures).

A conventional proportioning valve 18 is disposed on the rear wheel side conduit 14 so as to be located between the master cylinder 12 and the displacement actuator 30 disposed in the rear side conduit 14.

In accordance with FIGS. 2 and 3, details of the displacement actuator 30 will be described hereinafter. The displacement actuator 30 includes a housing 32, a plunger 33 slidably disposed in the housing 32 and movable by way of operation of a motor 31, a first valve 34 and a second valve 35. The housing 32 includes a stepped cylinder portion 32a in which is fitted the plunger 33 for movement in the axial direction. The plunger 33 and the cylinder portion 32a form the pressure control chamber 36.

The plunger 33 is formed with a first plunger 33a and a second plunger 33b. An upper portion of the second plunger 33b is located inside the first plunger 33a. The first plunger 33a has a seal cup 37 and is slidably disposed in the cylinder portion 32a. The first plunger 33a is always biassed by a spring 38 in the downward direction as seen in FIG. 2 so that the first plunger 33a engages at least one of a step portion 32a' of the cylinder portion 32a and a step portion 33b' of the second plunger 33b.

Figure 2:
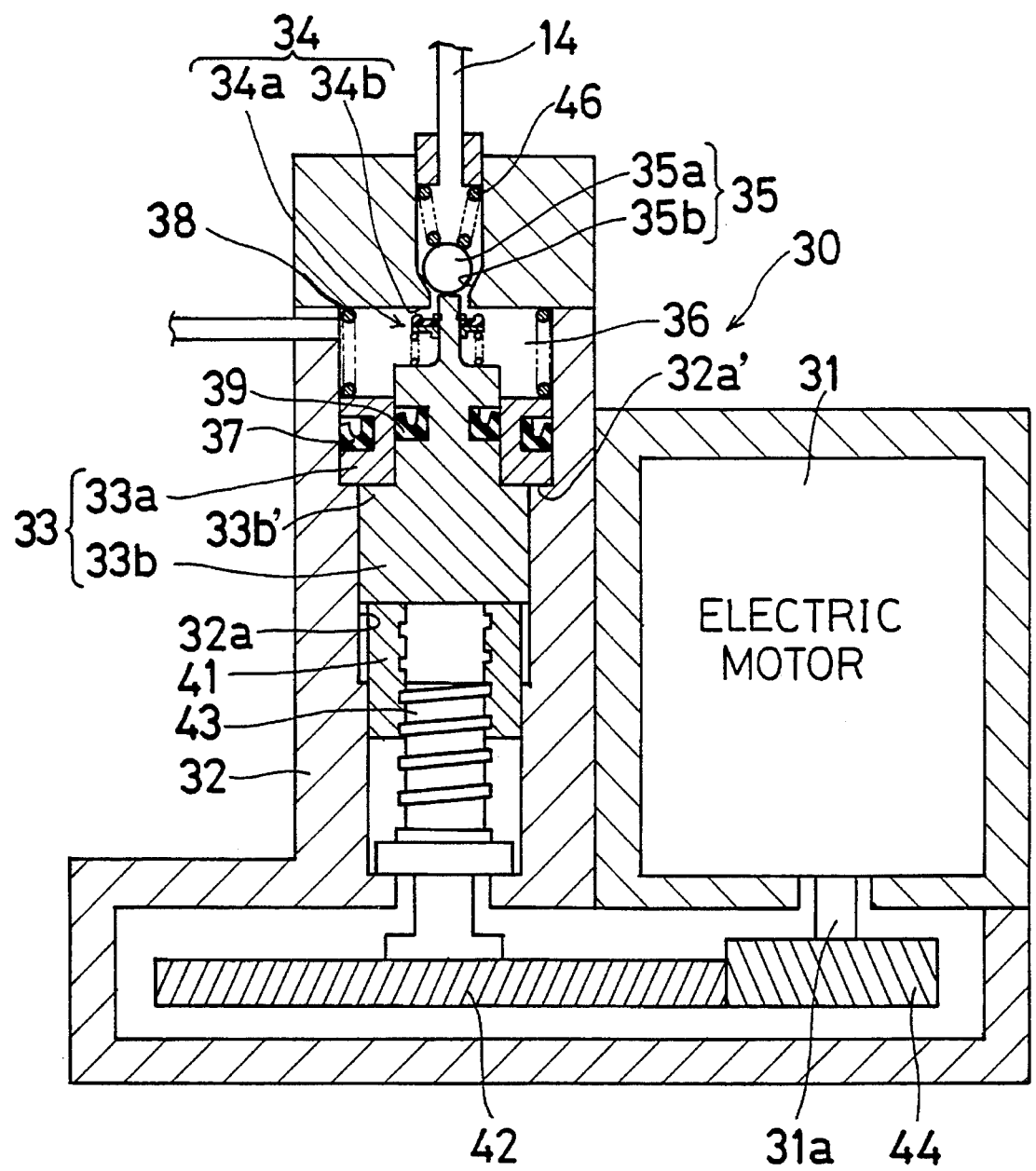
FIG. 2 is a cross-sectional view of a displacement actuator of the brake force control device for a vehicle of the present invention.
Figure 3:
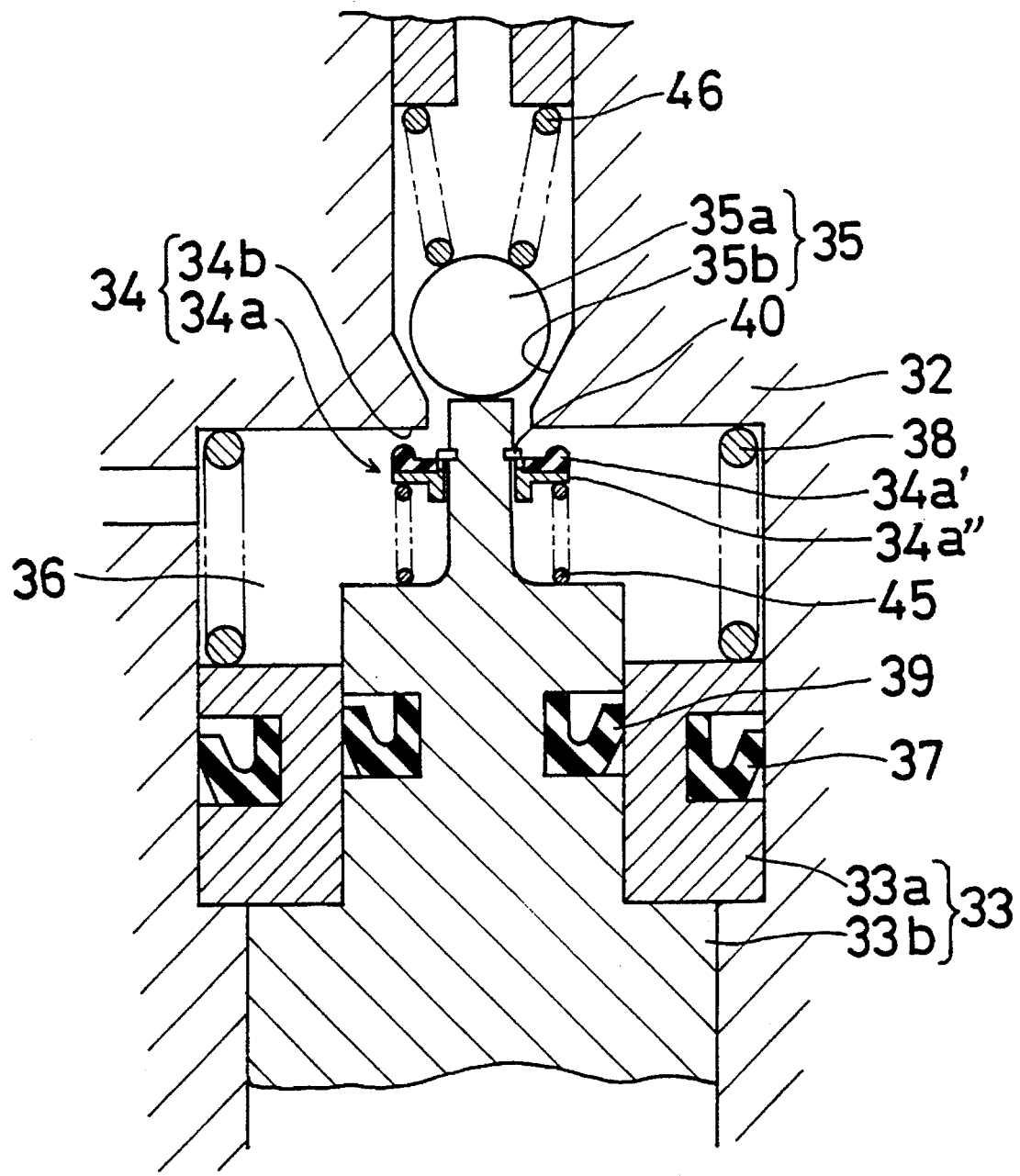
FIG. 3 is an enlarged detailed cross-sectional view of a displacement actuator of the brake force control device for a vehicle of the present invention.
Figure 4:
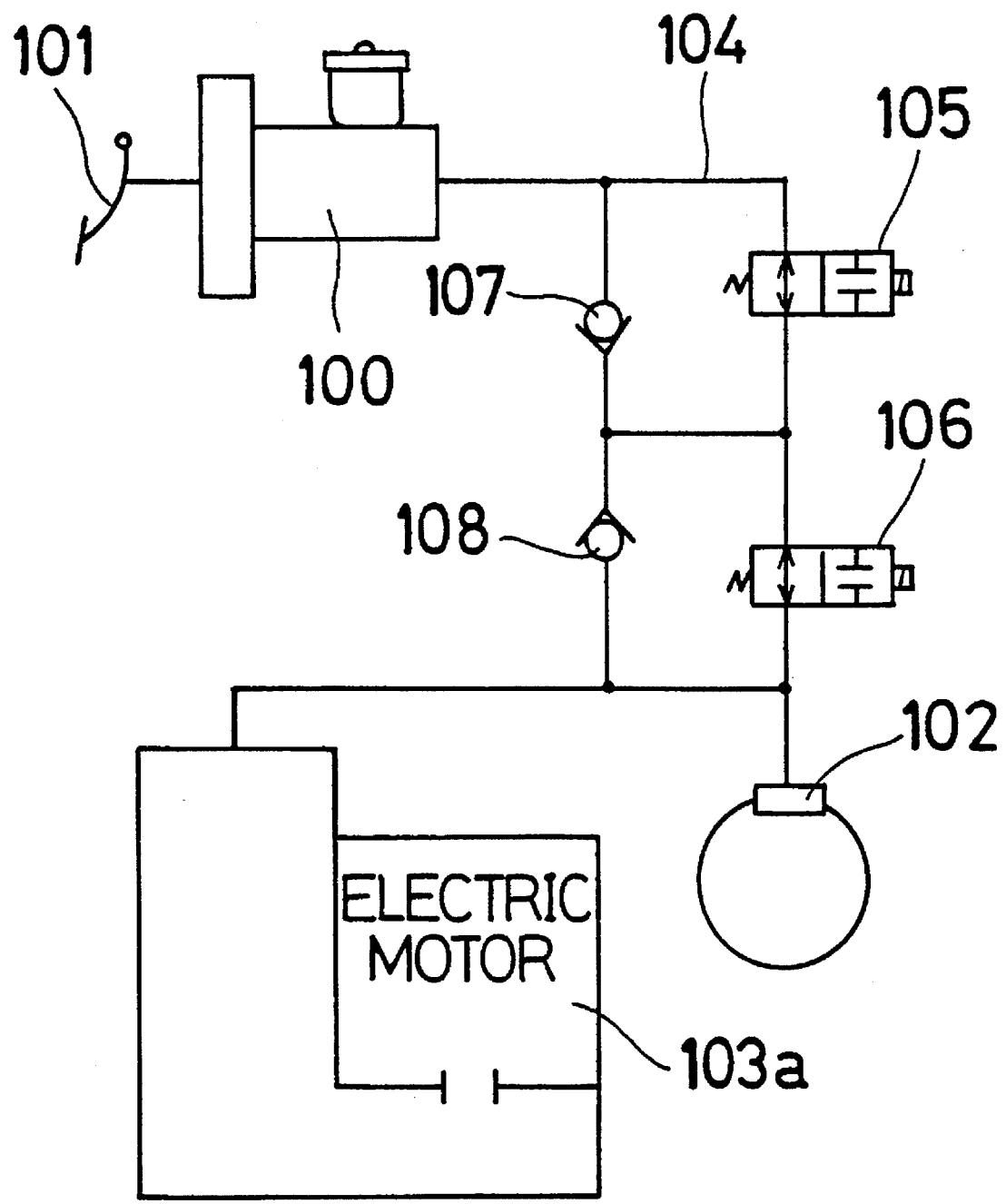
FIG. 4 is a circuit diagram of a prior art brake force control device for a vehicle of the prior art.

The second plunger 33b is formed with a large diameter portion, a medium diameter portion and a small diameter portion as shown in FIG. 2. The large diameter portion slidably fits in the cylinder portion 32a. The medium diameter portion having a seal cup 39 mounted on an outer peripheral portion thereof is slidably fitted in the hollow interior portion of the first plunger 33a. An engagement member 40 is fixed to the outer periphery of the small diameter portion as shown in FIG. 3 to hold a valve member 34a of the first valve 34. Further, the second plunger 33b is retained by a nut member 41 so as to be moved in the vertical direction as seen in FIG. 2 as a result of movement of the nut member 41.

The nut member 41 meshes with a screw member 43 which rotates together with a first wheel gear 42. The first wheel gear 42 engages a second wheel gear 44 which is fixed on an output shaft 31a of the electric motor 31. Therefore, the rotation of the electric motor 31 is transmitted to the nut member 41 through the second wheel gear 44, the first wheel gear 42 and the screw member 43, thereby moving the second plunger 33b in the vertical direction.

The valve member 34a is formed with an elastic member 34a' which is able to contact a valve seat 34b, and a holder 34a" which holds the elastic member 34a'. The valve member 34a is forced toward the engagement member 40 by a spring 45 as illustrated in FIG. 3.

On the other hand, the second valve 35 includes a valve seat 35b which is tapered in shape and a ball valve member 35a which is biassed toward the valve seat 35b by a spring 46.

The operation of the above-described embodiment of the brake force control device for a vehicle will be described hereinafter. The plungers 33 are located at an initial position as shown in FIGS. 2 and 3 and the solenoid valves 16, 17 are opened when the vehicle runs. When the electric controller CPU determines that it is necessary to decrease the vehicle speed as a result of receiving signals from a distance sensor detecting a distance interval to a front vehicle, a speed sensor, a sensor detecting a driver's doze, a sensor detecting a front obstacle and so on, the solenoid valves 16, 17 are closed and the electric motor 31 of each of the displacement actuators 30 is driven in the positive 10 direction to move the first and second plungers 33a, 33b in the upper direction as seen in FIG. 2 (auto brake condition). Therefore, the first valve 34 is closed so that the pressure control chamber 36 and the wheel brakes 20, 21, 22 and 23 are separated from the master cylinder 12. The capacity or volumetric space of each of the pressure control chambers 36 decreases so as to increase the fluid pressure in each of the pressure control chambers 36 and each of the wheel brakes 20, 21, 22 and 23 when the first and second plungers 33a, 33b move further in the upward direction.

At this moment, when the driver operates the brake pedal 10, a fluid pressure is generated in the master cylinder 12. When a bias force applied to each of the first valves 34 from the fluid pressure in the master cylinder 12 is larger than the sum of the elastic force of the spring 45 and the pressure force of the fluid pressure in the pressure control chamber 36, the first valve 34 is opened so that fluid pressure in the master cylinder 12 is transmitted to each of the wheel brakes 20, 21, 22 and 23.

When the driver operates the brake pedal 10 as usual, the fluid pressure generated in the master cylinder 12 is transmitted to the wheel brakes 20, 21, 22 and 23 to brake the wheels FR, FL, RR and RL.

When the electric controller CPU detects the wheel lock condition because of an extreme brake force applied to each of the wheels FR, FL, RR and RL on a snowy road, a frozen road, or the like, the corresponding solenoid valves 16, 17 are closed and the electric motors 31 of the corresponding displacement actuators 30 is driven in the negative direction to move the second plunger 33b in the lower direction (antilock condition). Therefore, the second valve 35 is closed so that the pressure control chamber 36 and the corresponding wheel brakes 20, 21, 22 and 23 are separated from the master cylinder 12. The capacity or volumetric space of the pressure control chamber 36 thereby increases to decrease the fluid pressure in the pressure control chamber 36 and the corresponding wheel brakes 20, 21, 22 and 23 when the second plunger 33b moves further in the downward direction. Consequently, the brake force applied to the corresponding wheels FR, FL, RR and RL is decreased so that each of the wheels FR, FL, RR and RL is able to grasp the road.

At this moment, when the driver releases the brake pedal 10, the fluid pressure in the master cylinder 12 is decreased. Therefore, when the force which is generated by the pressure differential between the pressure control chamber 36 and the master cylinder 12 is larger than the elastic force of the spring 46, the second valve 35 is opened to thereby decrease the fluid pressure in the wheel brakes 20, 21, 22 and 23.

When the electric controller CPU detects the existence of a wheel slip condition because of an extreme driving force applied to the driving wheels RR, RL on a snowy road, frozen road, or the like, the electric motor 31 of the driving wheel side displacement actuator 30 is driven in the positive direction to move the first and second plungers 33a, 33b in the upper direction (antislip condition). Therefore, the first valve 34 is closed so that the pressure control chamber 36 and the driving wheel brakes 22 and 23 are separated from the master cylinder 12. The capacity or volumetric space of the pressure control chamber 36 decreases to thereby increase the fluid pressure in the pressure control chamber 36 and the driving wheel brakes 22 and 23 when the first and second plungers 33a, 33b move further in the upward direction. Consequently, the driving force applied to each of the driving wheels RR, RL is decreased so that the driving wheels RR, RL are able to grasp the road.

In accordance with the above-described embodiment, the first valves 34 are opened to brake the wheels FR, FL, RR and RL when the driver operates the brake pedal 10 under the antislip condition and the auto brake condition. Further, the second valves 35 are opened to release the brake forces from the wheels FR, FL, RR and RL when the driver releases the brake pedal 10 under the antilock condition. Therefore, the brake force control device for a vehicle can be applied to an auto brake system, an antilock system and an antislip system with a simple structure and a low cost.

Further, the brake force control device for a vehicle comprises a first plunger 33a and a second plunger 33b. Therefore, both of the first and second plungers 33a, 33b are moved to apply large brake forces to the wheels FR, FL, RR and RL in the early stage under the antislip condition and the auto brake condition. On the other hand, under the antilock condition only the second plunger 33b is moved to precisely control the brake force.

In accordance with the above embodiment, the brake force control device for a vehicle comprises the bypass conduits 15 which are in parallel arrangement with the displacement actuators 30 and the solenoid valves 16, 17. Therefore, even if the conduits 14 become disconnected because of the damage of the displacement actuators 30, the fluid pressure can be applied to the wheel brakes 20, 21.

While the invention has been particularly shown and described with reference to a preferred embodiment thereof, it will be understood by those skilled in the art that the foregoing and other changes in form and details can be made therein, and equivalents employed therein, without departing from the spirit and scope of the invention.

What is claimed is:

1. A brake force control device for a vehicle comprising:

a master cylinder operable by an operating member of the vehicle;

a wheel brake mountable on a vehicle wheel and connected to the master cylinder through a conduit;

a pressure control chamber connected to the wheel brake;

a displacement actuator that includes a plunger member which varies a capacity of the pressure control chamber, a drive unit which drives the plunger member, a first valve which closes the conduit when the plunger member is operated to decrease the capacity of the pressure control chamber and which opens the conduit when the first valve receives a brake pressure from the master cylinder which is larger than the pressure in the pressure control chamber with a predetermined value, and a second valve which closes the conduit when the plunger member is operated to increase the capacity of the pressure control chamber and which opens the conduit when the brake pressure in the pressure control chamber is larger than the pressure in the master cylinder with a predetermined value; and a control unit which controls the displacement actuator.

2. A brake force control device for a vehicle as recited in claim 1, wherein the plunger includes a first plunger and a second plunger, at least a portion of the second plunger being slidably disposed inside the first plunger, one of the first plunger and the second plunger being driven by the drive unit.

3. A brake force control device for a vehicle as recited in claim 1, including a bypass conduit disposed in parallel arrangement with the displacement actuator, and a solenoid valve disposed in the bypass conduit.

4. A brake force control device for a vehicle as recited in claim 2, including a bypass conduit disposed in parallel arrangement with the displacement actuator, and a solenoid valve disposed in the bypass conduit.

5. A brake force control device for a vehicle as recited in claim 2, including a spring operatively associated with the first plunger for urging the first plunger away from the second valve.

6. A brake force control device for a vehicle as recited in claim 1, wherein said first valve and said second valve each includes a spring biased valve element, the spring biased valve element of the first valve being biased in a direction opposite to the direction in which the spring biased valve element of the second valve is biased.

7. A vehicle brake force control device comprising:

a master cylinder operable by an operating member;

a wheel brake mountable on a vehicle wheel and connected to the master cylinder through a conduit;

a displacement actuator connected to the conduit, said displacement actuator including a housing, a plunger member which defines a pressure control chamber within the housing, a drive unit operatively associated with the plunger member to slidably move the plunger within the housing to vary a volumetric space of the pressure control chamber, a first valve disposed in the housing which closes the conduit when the plunger member is slidably moved to increase the pressure in the pressure control chamber and which opens the conduit when a pressure differential between the pressure from the master cylinder and the pressure in the pressure control chamber exceeds a first predetermined value, and a second valve disposed in the housing which closes the conduit when the plunger member is slidably moved to increase the pressure in the pressure control chamber and which opens the conduit when a pressure differential between the pressure in the pressure control chamber and the pressure from the master cylinder exceeds a second predetermined value; and a control unit connected to the drive unit for controlling operation of the drive unit to move the plunger member in one direction in which the conduit is closed by the first valve and to move the plunger member in an opposite direction in which the conduit is closed by the second valve member.

8. A vehicle brake force control device as recited in claim 7, wherein said first and second valves are each biased by a spring towards a position which closes the conduit.

9. A vehicle brake force control device as recited in claim 8, wherein the spring which biases said first valve imparts a biasing force to the first valve that is equal to the first predetermined value and the spring which biases the second valve imparts a biasing force to the second valve that is equal to the second predetermined value.

10. A vehicle brake force control device as recited in claim 7, wherein said first valve is mounted on the plunger member so that the first valve moves the plunger member.

11. A vehicle brake force control device as recited in claim 7, including a spring which biases the plunger member.

* * * * *